W. A. HOUCK.
KNITTING MECHANISM, INSTRUMENT THEREFOR, AND METHOD OF KNITTING.
APPLICATION FILED AUG. 12, 1919.

1,400,163.

Patented Dec. 13, 1921.
9 SHEETS—SHEET 1.

Inventor:
William A. Houck,
by Emery, Booth, Janney and Varney,
Attys.

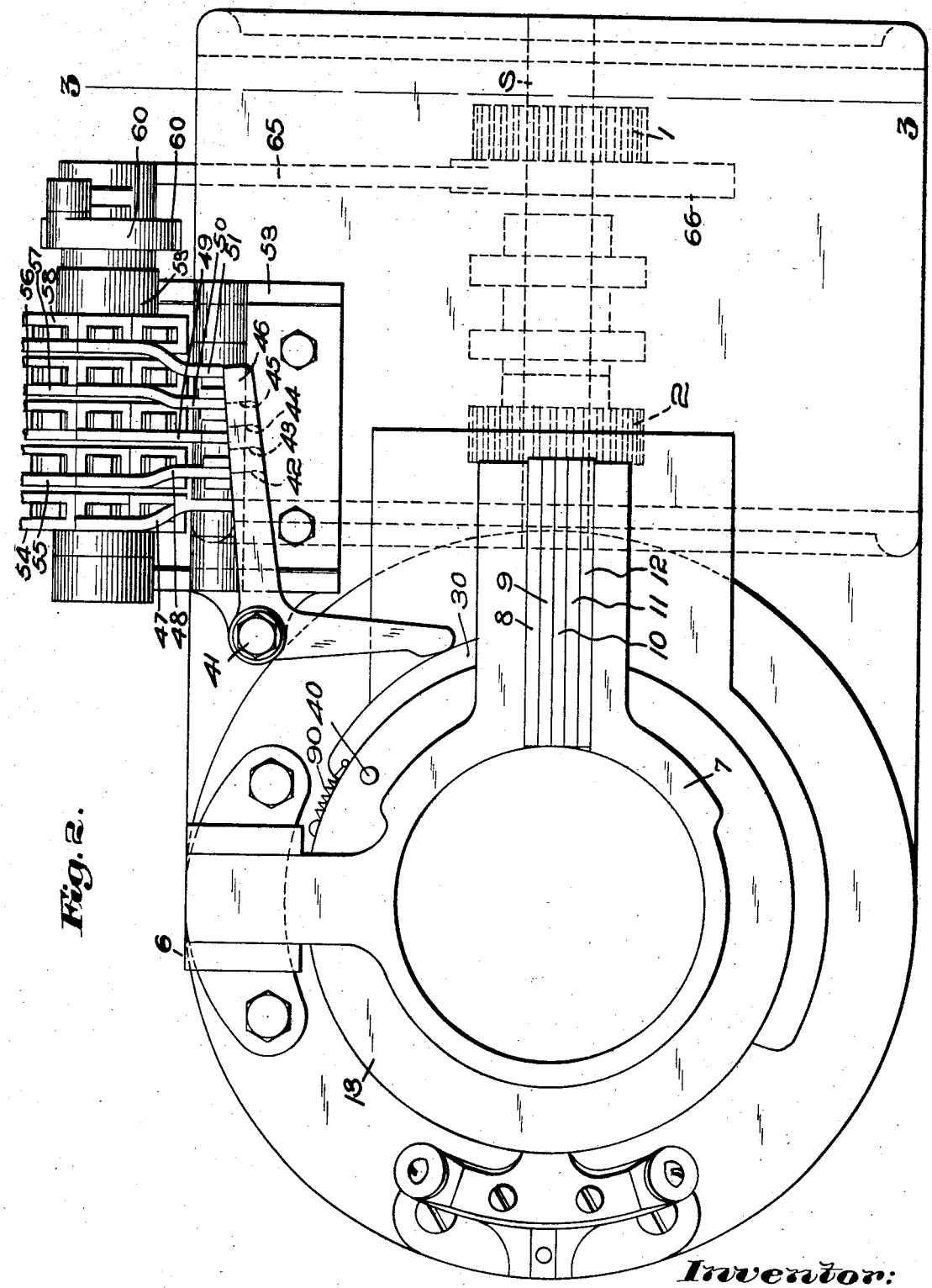

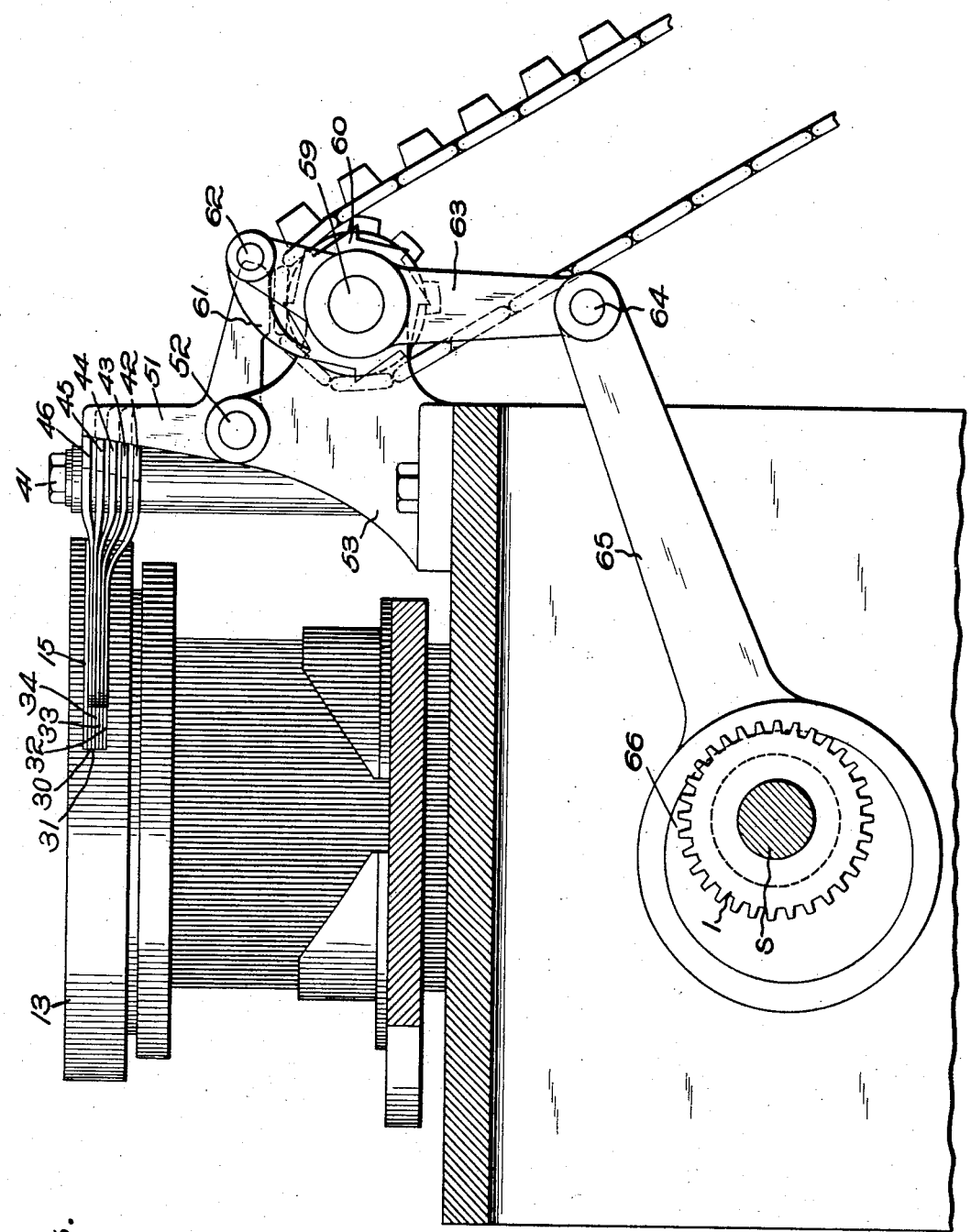

W. A. HOUCK.
KNITTING MECHANISM, INSTRUMENT THEREFOR, AND METHOD OF KNITTING.
APPLICATION FILED AUG. 12, 1919.
1,400,163.
Patented Dec. 13, 1921.
9 SHEETS—SHEET 4.
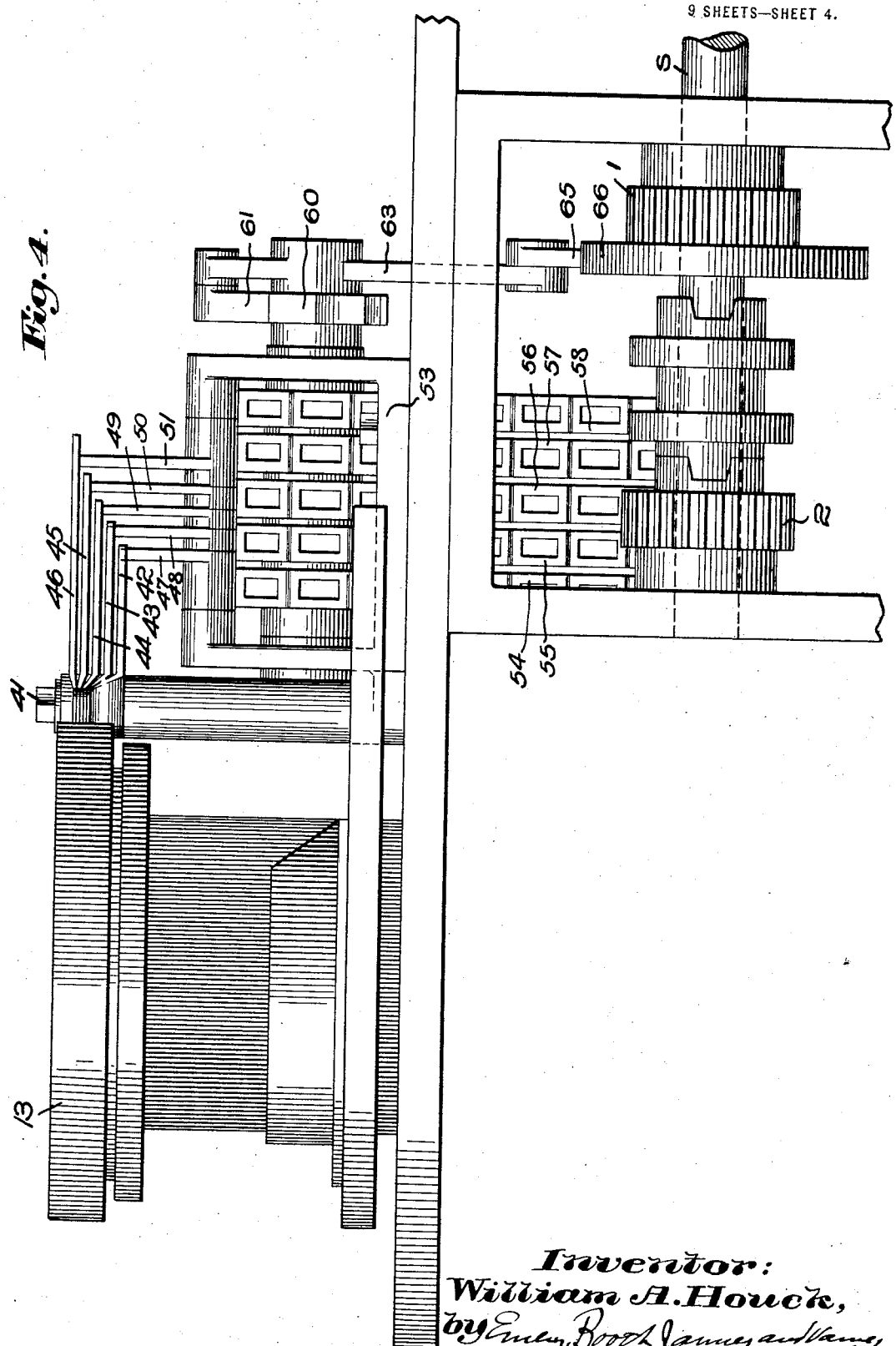
Inventor:
William A. Houck,
by Emery, Booth, Janney and Varney
Attys W. A. HOUCK.
KNITTING MECHANISM, INSTRUMENT THEREFOR, AND METHOD OF KNITTING.
APPLICATION FILED AUG. 12, 1919.
1,400,163.
Patented Dec. 13, 1921.
9 SHEETS—SHEET 5.
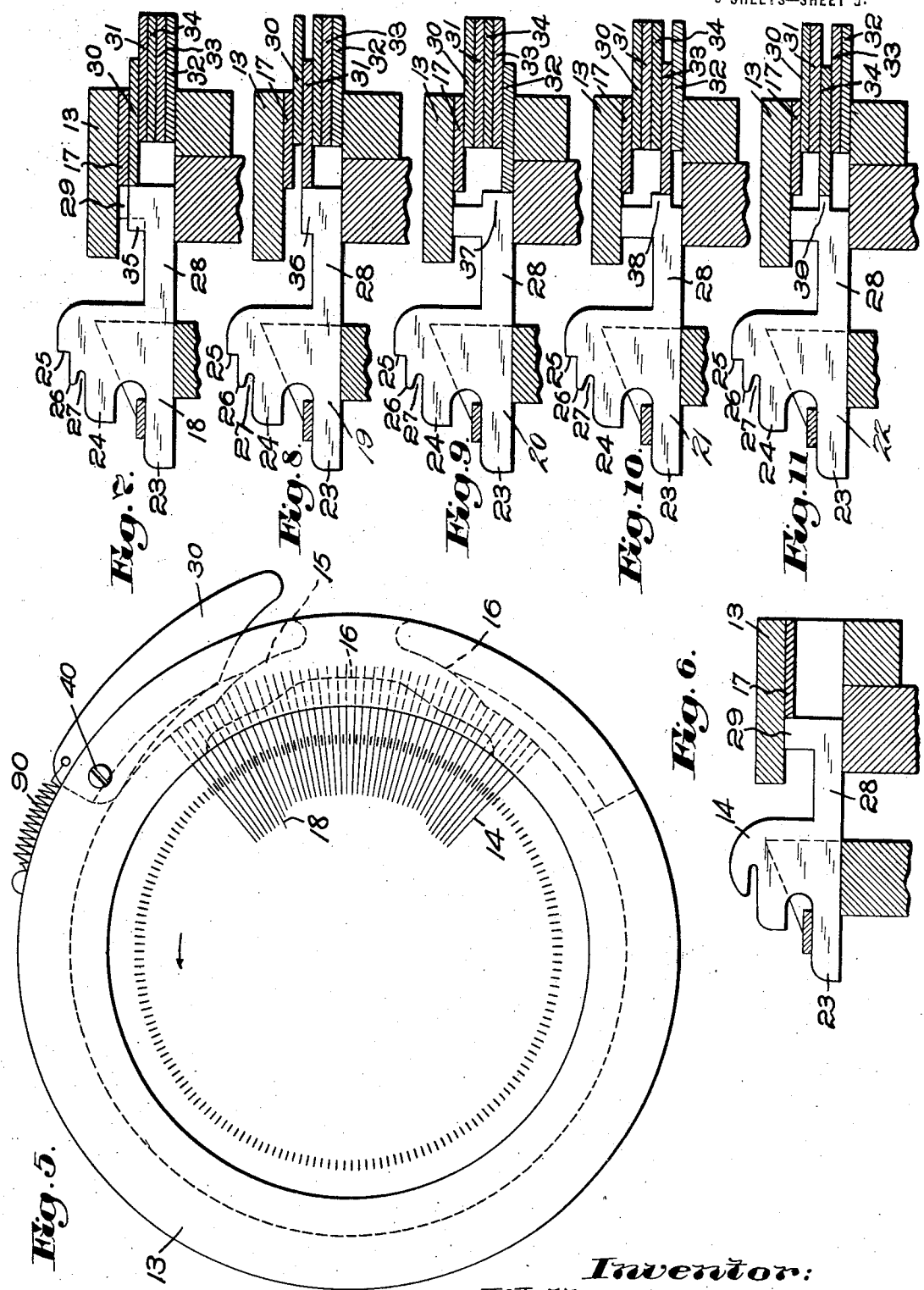

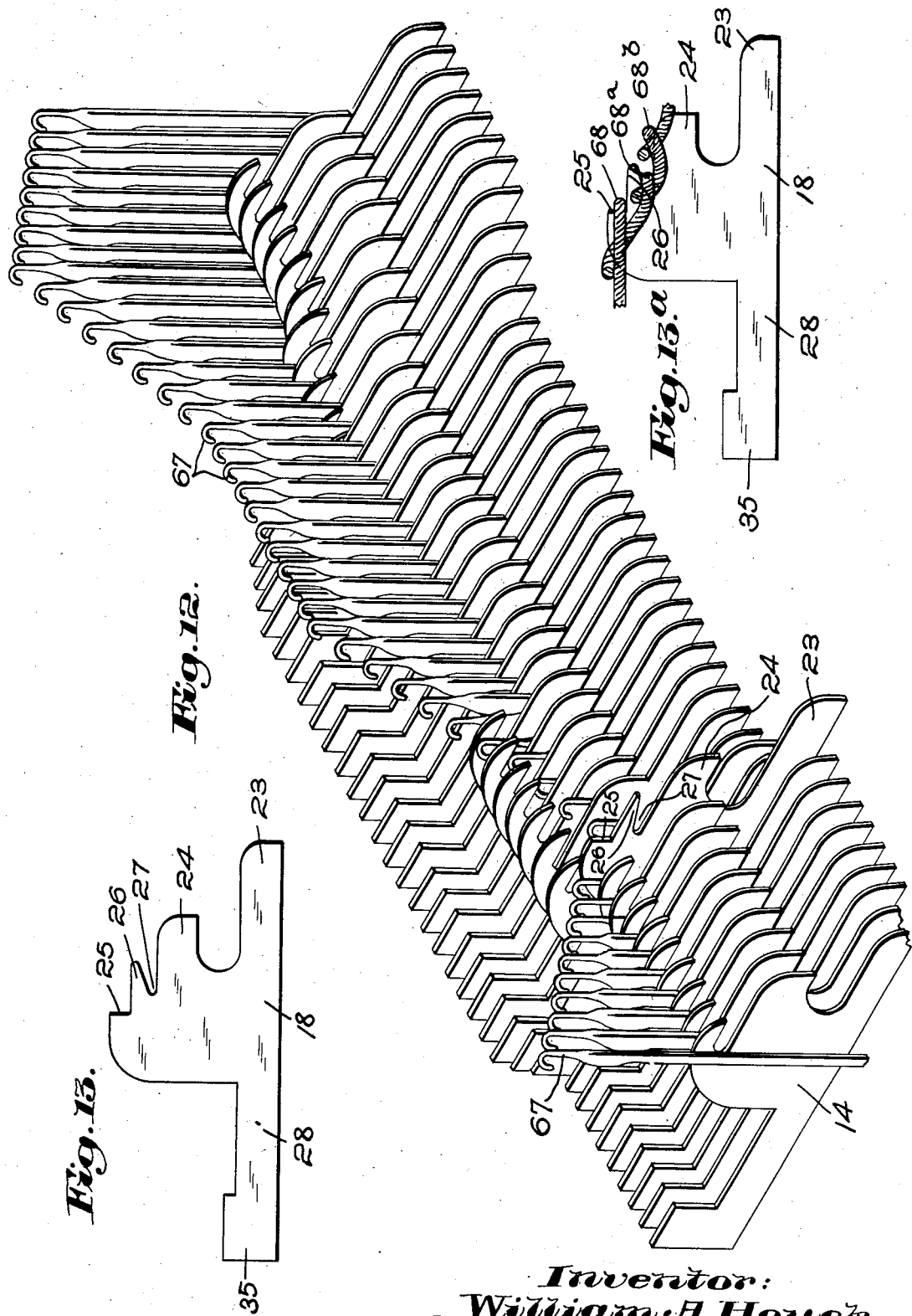

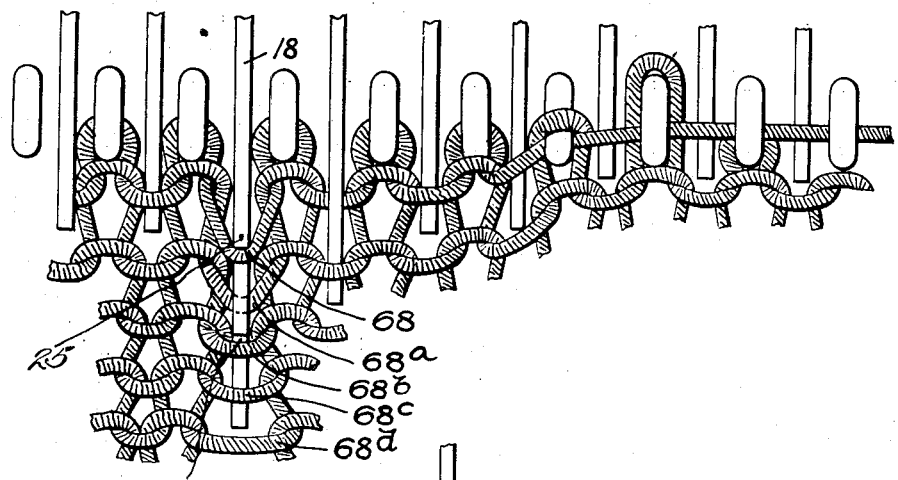
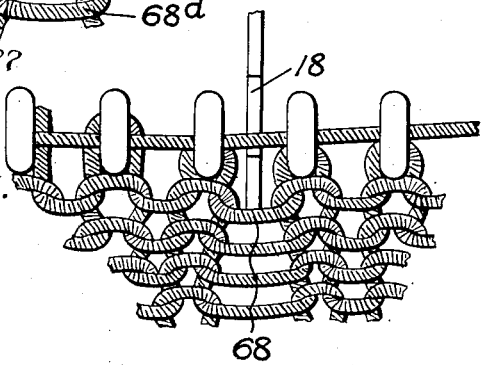
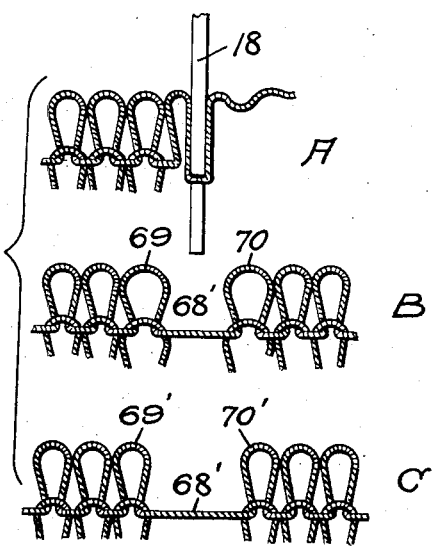

W. A. HOUCK.
KNITTING MECHANISM, INSTRUMENT THEREFOR, AND METHOD OF KNITTING.
APPLICATION FILED AUG. 12, 1919.
1,400,163.
Patented Dec. 13, 1921.
9 SHEETS—SHEET 8.
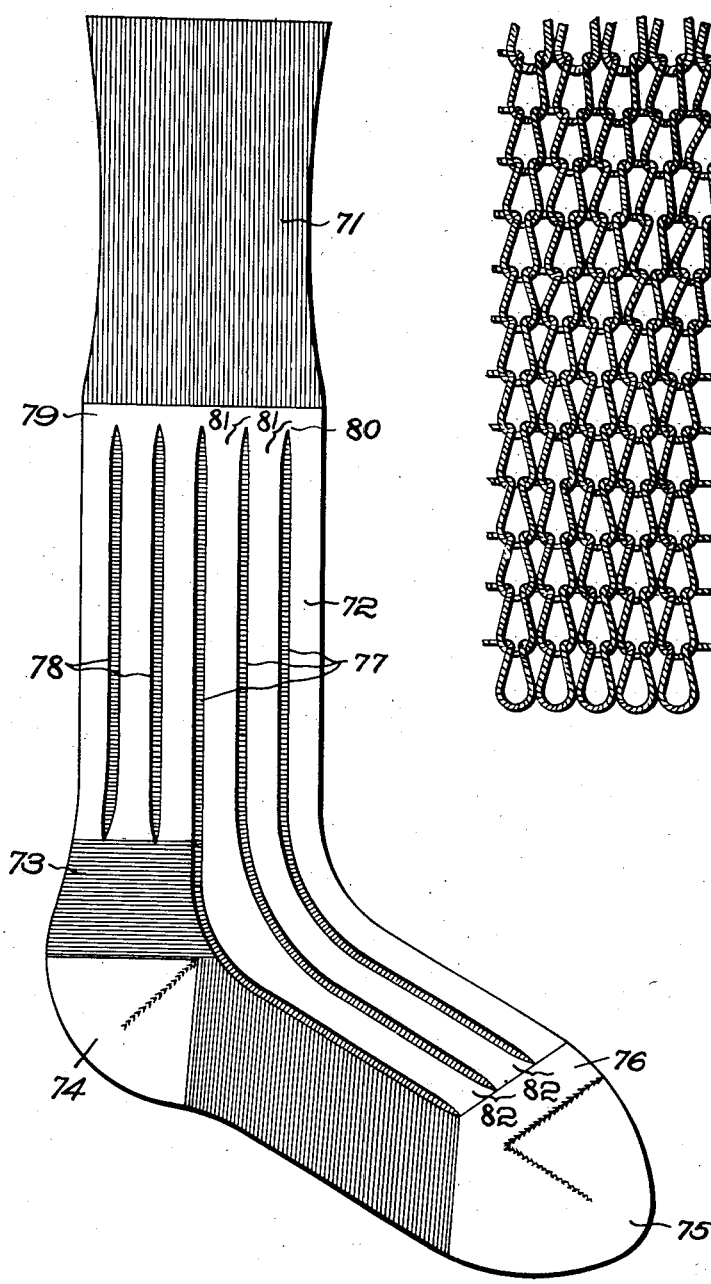
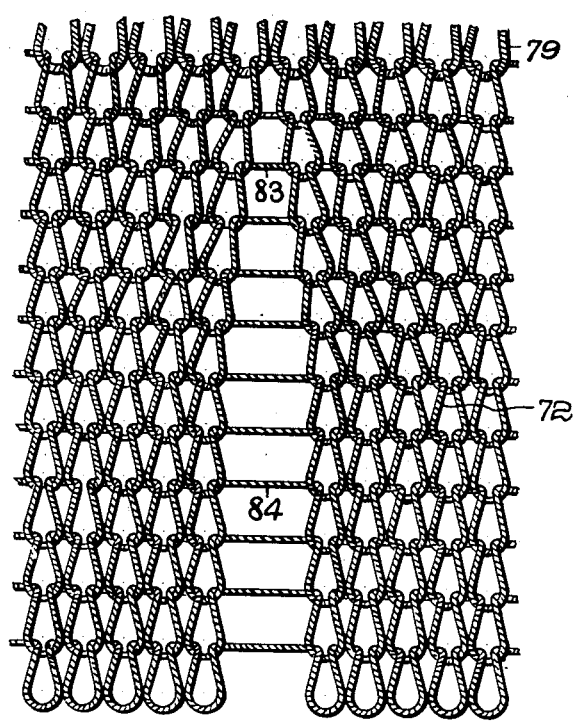
Inventor:
William A. Houck.
by Emery, Booth, Janney and Varney
Attys.

W. A. HOUCK.
KNITTING MECHANISM, INSTRUMENT THEREFOR, AND METHOD OF KNITTING.
APPLICATION FILED AUG. 12, 1919.
1,400,163.
Patented Dec. 13, 1921.
9 SHEETS—SHEET 9.
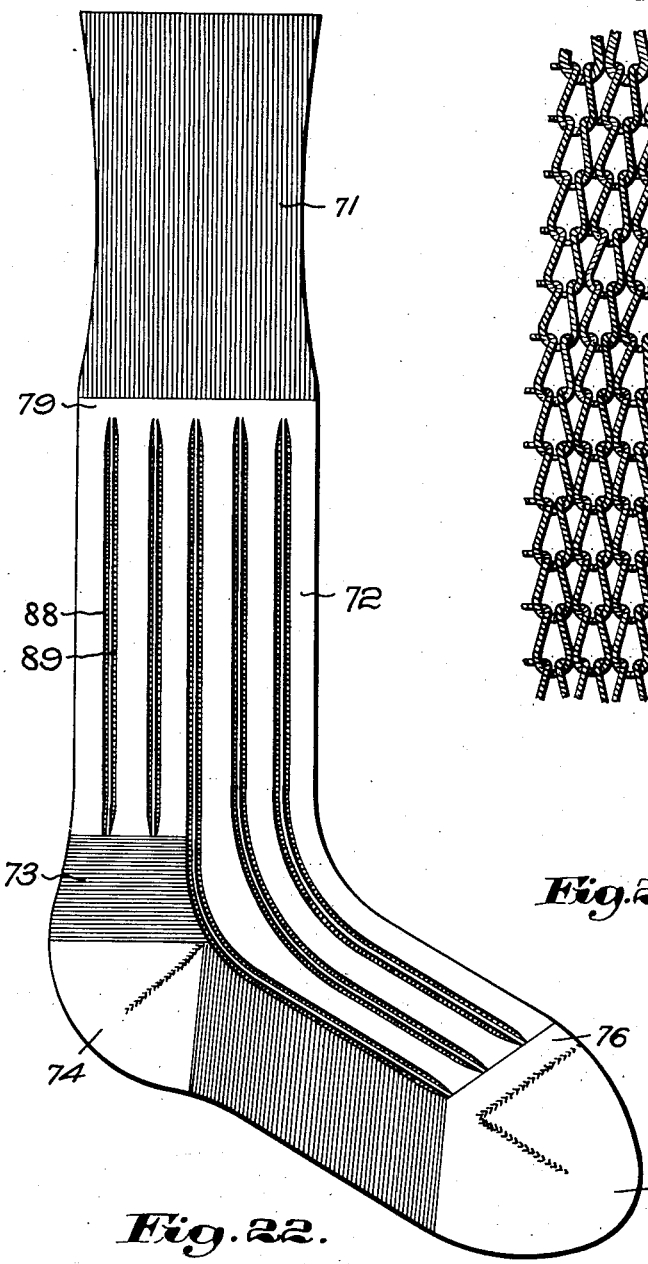
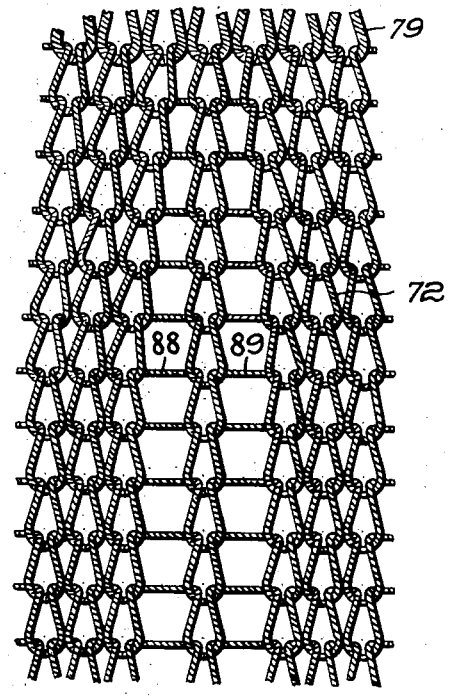
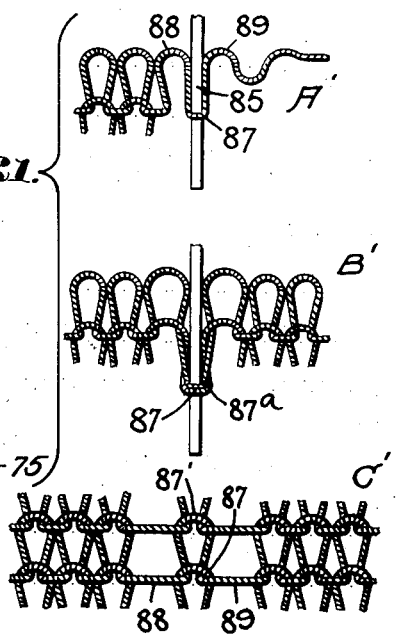
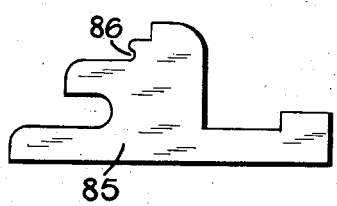
Inventor:
William A. Houck,

UNITED STATES PATENT OFFICE.

WILLIAM A. HOUCK, OF READING, PENNSYLVANIA, ASSIGNOR TO HEMPHILL COMPANY, OF PAWTUCKET, RHODE ISLAND, A CORPORATION OF MASSACHUSETTS.

KNITTING MECHANISM, INSTRUMENT THEREFOR, AND METHOD OF KNITTING.

1,400,163.           Specification of Letters Patent.     Patented Dec. 13, 1921.

Application filed August 12, 1919. Serial No. 317,068.

*To all whom it may concern:*

Be it known that I, WILLIAM A. HOUCK, a citizen of the United States, and a resident of Reading, in the county of Berks and State of Pennsylvania, have invented an Improvement in Knitting Mechanism, Instruments Therefor and Methods of Knitting, of which the following description, in connection with the accompanying drawings, is a specification, like characters on the drawings representing like parts.

This invention relates to knitting mechanism, instruments therefor and to a method of knitting which may be practised by said mechanism. In order that the principle of the invention may be readily understood, I have in the accompanying drawings shown one type of knitting mechanism embodying my invention and by which my method may be practised and have indicated certain of the fabrics produced by said mechanism.

In said drawings,—

Fig. 2 is a plan view of the main part of the mechanism shown in Fig. 1, but more particularly illustrating the features of my invention;

Fig. 3 is a vertical sectional view upon the line 3—3 of Fig. 2;

Fig. 4 is a vertical section view on the line 4—4 of Fig. 2;

Fig. 5 is a plan view representing the cams for controlling the sinkers including the special sinkers or instruments employed in the practice of my invention;

Figure 1:
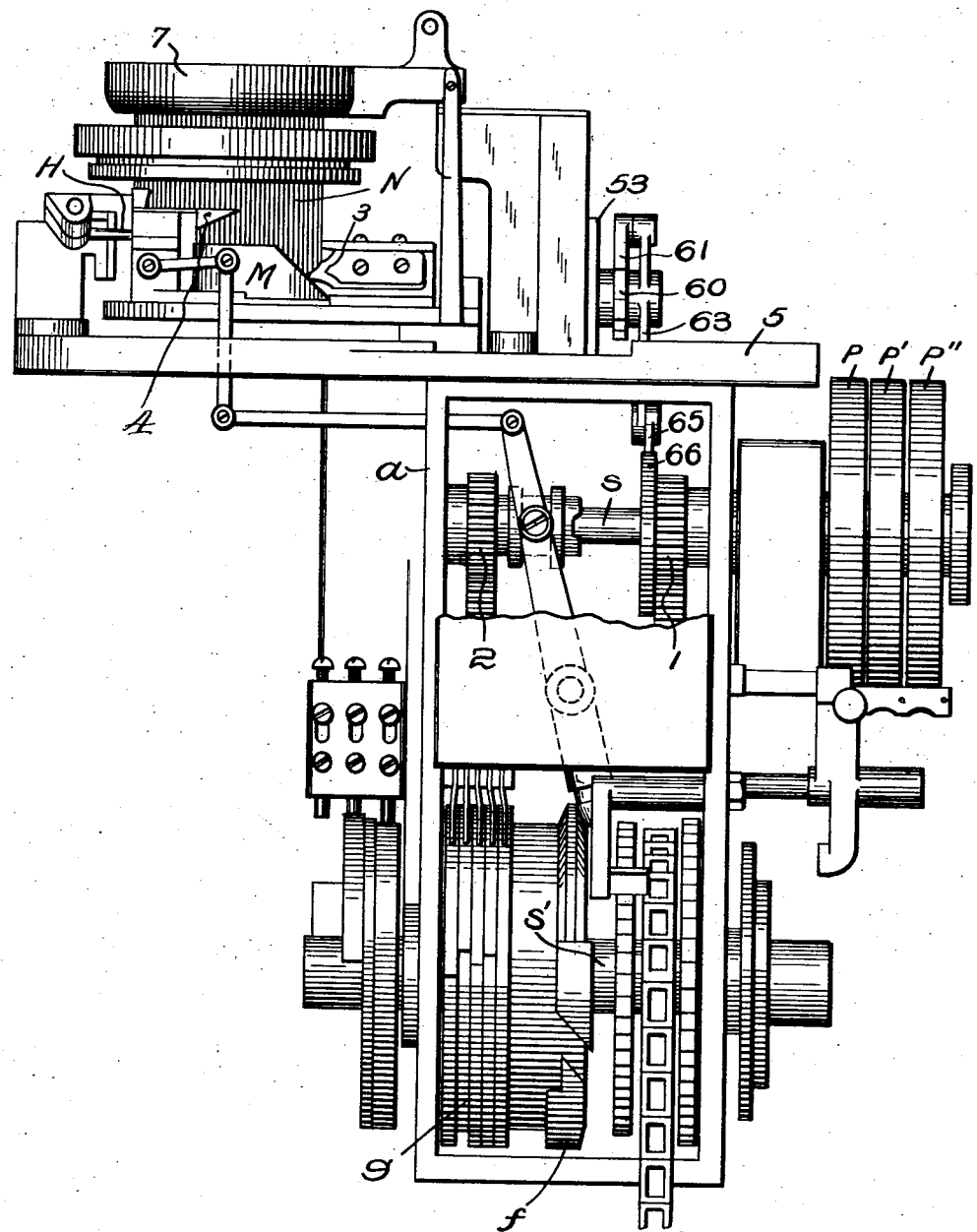
Figure 1 is a front elevation of a knitting machine having my invention incorporated therein or applied thereto.

Figs. 6 to 11 inclusive are views partly in side elevation and partly in vertical section showing various forms of sinkers preferably employed in the practice of my invention and the operating sinker cams therefor;

Fig. 12 is a perspective view of certain of the knitting needles and regular sinkers at and adjacent to the knitting position and showing a special sinker preferably employed with my invention;

Fig. 13 is a side elevation of one of the special sinkers shown in Figs. 7 to 11;

Fig. 13ª is a view of the special sinker at one stage of the action thereof upon the yarn or thread;

Fig. 14 is a somewhat diagrammatic representation and upon an enlarged scale of the fabric produced in accordance with the preferred method of operation herein disclosed and representing the same at one stage of the operation;

Fig. 15 is a similar view but representing the fabric at a different stage of the operation;

Fig. 16 represents diagrammatically merely three stages in the formation of the open work or lace work effect;

Fig. 17 represents a portion of the fabric in its complete or final form and shape;

Fig. 18 represents a stocking or hose produced by the method herein disclosed;

Fig. 19 represents a portion of knitted fabric formed by the practice of a slightly modified form of my invention;

Fig. 20 is a side elevation of a hose or stocking embodying the fabric shown in Fig. 19;

Fig. 21 indicates diagrammatically certain steps in the production of the fabric shown in Figs. 19 and 20; and Fig. 22 represents a sinker of special form preferably employed in producing the fabric shown in Figs. 19 and 20.

My invention more particularly relates to machines for knitting hosiery or other fabrics with so-called open work or lace effects caused by structural variations of any suitable character in the knitted fabric and to a method of knitting whereby so-called openwork or lace work effects may be produced.

The mechanism of my invention may be embodied in many different types of knitting machines and is not limited in this respect. While my method may be practised in many ways, I will set forth the best mode known to me for carrying out the same. I have chosen to represent my invention as embodied in a circular knitting machine of the so-called Banner type, one form of which is disclosed in the patent to Hemphill, No. 933,443, September 7, 1909, to which reference may be made for a complete disclosure of parts herein unnecessary to set forth in detail.

I shall proceed to describe my invention as applied to a machine of the Banner type, but it is to be understood that such specific description is in no sense a limitation of the scope of the invention.

Inasmuch as certain general parts of the mechanism herein shown may be and preferably are the same as those shown in the said patent to Hamphill, No. 933,443, I have designated such parts by the same reference characters that are employed in the said patent. Thus, the machine frame is marked *a*, the rotatable needle cylinder is marked N, the non-rotatable cam carrier is marked H, and the annular portion or ledge of the cam carrier is marked M. The pulleys for the driving band are marked respectively *p*, *p'*, and *p"* in Fig. 1 (quick speed, slow speed and loose), and at *s* in said figure as well as in Fig. 3 is indicated the main shaft on which the said pulleys are mounted, and also carrying as indicated in Fig. 2 the gear 1 for driving the parts in circular work and the gear 2 for driving the parts during reciprocating work. The main pattern shaft is indicated at *s'* in Fig. 1, *f* and *g* being the pattern or cam drums or barrels upon the said shaft. Upon said drum or barrel *f* is preferably provided a pattern ring engaging the clutch shifting lever, whereby the clutch is shifted so as to operate by rotary or round and round knitting throughout the formation of the leg and preferably the foot of the stocking, and by reciprocating knitting throughout the formation of the heel and toe in a manner not herein necessary more fully to describe. In the disclosed application or embodiment of my invention, the needle cylinder rotates and reciprocates, and the cam ring is stationary, but obviously the reverse construction and operation may be employed. Moreover my invention may be embodied and practised in other types of machines, such, for example, as those adapted to knit so-called split foot hosiery, or in machines that reciprocate throughout, as in the production of gloves or of full fashioned stockings, or in so-called straight machines of the independent needle type. So far as my invention is concerned, it is merely necessary to provide for a relative movement between the needle carrier and the needle operating cams.

Upon the usual cam block, diagrammatically indicated at 3, are mounted the usual stitch cams and the usual narrowing pickers. At a suitable point upon the cam ring is mounted the usual instep cam 4 to lower all the needles, and there is also preferably provided the leveling cam and the widening pickers desirably two in number and preferably constructed and operating as shown in the said patent to Hemphill. If desired, a single widening picker may be employed instead and operated in a manner not herein necessary more fully to describe.

The needles may be of any suitable character of the independent needle type and either latch needles or spring beard needles, the former being herein indicated. The needles are vertically reciprocated in their grooves in a customary manner.

Upwardly extending from the bed 5 of the machine is the usual post 6 upon the upper end of which is pivoted in any usual manner a so-called latch ring or guard 7, which herein is represented as entirely surrounding the circle of needles. Obviously a partial latch or guard ring of any suitable character may be employed. Preferably pivotally mounted in the said latch ring and in the general manner indicated in the said Hemphill Patent No. 933,443 are a series of yarn guide levers here shown as five in number, 8, 9, 10, 11 and 12, and by which the desired threads may be fed, such as the regular thread or threads for the leg, the high splicing thread, the heel and toe thread, etc. These yarn guide levers are mounted in an opening in the latch ring 7, and are operated in a manner not herein necessary more fully to describe.

Operatively related to the needle cylinder M is a sinker cam ring 13, more clearly shown in Fig. 5, and surrounding sinkers or web holders certain of which, being those which are employed in producing fabrics of usual or normal character, are preferably of the form indicated at 14 in Fig. 6. The said sinkers 14, which for convenience I will herein term the regular sinkers, are mounted for regular movement in the upper edge of the needle cylinder and are adapted to be moved radially by preferably fixed cams of any suitable character, such as the cams 15, 16, 17, indicated in Fig. 5, for the purpose of engaging the thread between its points of engagement by the needles and thus to cooperate with the needles in the formation of the loops or stitches in a manner not herein necessary more fully to describe, and desirably also acting as web holders, though within the scope and purpose of my invention other web holding instruments may be employed.

The said sinker cam ring 13 rests loosely upon or about the upper end of the needle cylinder and is held from rotation with the needle cylinder and its needles and sinkers in any suitable manner, as by means of adjustable screws or stops tapped into ears or lugs carried by or formed upon the cam ring, and not herein necessary more fully to describe, it being noted, however, that the ears or lugs are desirably spaced somewhat more widely apart than the width of the post 6 carrying the latch or guard ring 7, thus permitting a certain extent of lost motion between the needle cylinder and the sinker cam ring. This lost motion is preferably provided to permit the proper positioning of the cams of the sinker ring with respect to the cams of the can ring, that is, with respect to the knitting wave of the knitting needles in a manner well known and not herein necessary more fully to describe.

Referring to Fig. 5, it is to be understood that the needle cylinder is rotating in the direction of the arrow thereon, that is, in a contraclockwise direction, and that therefore the sinker cams remain inactive until in the rotation of the needle cylinder the sinker cam ring has been carried frictionally in the direction of the arrow until one of the screws engages the post 6, whereon the movement of the sinker cam ring ceases and thereupon the sinkers 14 are moved in and out or radially in the customary manner in coöperation with the knitting wave of the knitting needles. Desirably I employ a full circle of needles all of normal character as regards lengths of butts, lengths of latches, etc., preferably in accordance with the preferred type of Banner machine for making hosiery of usual character, that is, without open work or lace effects. I produce the open work or lace effect by certain instruments which for convenience of description, I will refer to as special sinkers and which may be of any desired number, depending upon the pattern that is to be produced, and may be, if desired, of distinguishing characteristics among themselves so as to permit of a wide range of pattern of so-called open or lace work effects. Certain of said so-called special sinkers and differing among themselves in characteristics are indicated at 18, 19, 20, 21, 22 in Figs. 7 to 11 inclusive. Each of the said special sinkers or instruments is preferably provided with a usual guiding member 23, a usual web engaging member 24, a special shoulder 25, and a special nose or projection 26 at the under side of which is formed a throat 27.

All of the sinkers including the regular sinkers 14 are provided with tails or projections 28, the regular sinkers 14 having upwardly extending heels 29 of normal length and adapted to be engaged only by the stationary cams, one of which indicated at 17 in Fig. 6.

I have chosen in the preferred embodiment of my invention to represent five types or forms of special sinkers, though this number may be extended or lessened as desired. In order to operate the special sinkers, I employ an equal number of sinker cams, herein five in number, and indicated as engaging the proper special sinkers at 30, 31, 32, 33, 34 in Figs. 7 to 11 inclusive. In order to permit said cams 30 to 34 respectively to act only upon the special type or form of sinker pertaining thereto, the appropriate special sinkers are provided with special forms of heels; thus the special sinker 18 shown in Fig. 7 is provided with a special type of heel 35 lower than the heels 29 of the regular sinkers 14, the special sinker 19 is provided with a still lower special heel 36 indicated in Fig. 8, and the special sinkers 20, 21, 22 are respectively shaped as therein shown, the special sinker 20 also having a heel whereby the sinker may be retracted by the stationary cams, said sinker terminating in a straight edge 37, the special sinker 21 having a special wide projection 38 and the special sinker 22 having a narrower projection 39, said special sinkers 21, 22 also having heels, whereby they may be retracted by the stationary cams. In this or in any other suitable manner, I provide for the operation of the special sinkers and desirably in such manner that upon each and every desired course of the stocking or other fabric, open work or lace work effects may be produced at one or more points, and desirably both at the front and rear of the stocking, as hereinafter more fully described.

In order to operate the five special cams 30 to 34, inclusive, I preferably mount them upon a single pivot 40, shown in Fig. 5, and provide suitable means for moving radially inward into operative relation with the appropriate sinkers the desired special cams. Any suitable means may be provided for the purpose. Herein I have represented five bell crank levers pivoted at 41 upon the framing of the machine and indicated at 42, 43, 44, 45, 46 respectively, the inner arms of said bell crank levers preferably lying close together and shaped as indicated in Fig. 3, so that each arm acts only upon its appropriate sinker cam 30 to 34 inclusive. The outer or opposite arms of said levers are of progressively increasing length as indicated in Fig. 2 and are adapted to be acted upon by five bell crank levers 47, 48, 49, 50, 51, which as most clearly shown in Figs. 2 and 3 are loosely mounted upon a stud 52, itself mounted in suitable bearings 53, 53, secured in or as brackets upon the framing of the machine. The lower or substantially horizontal arms of said levers 47 to 51 inclusive, are adapted to be acted upon by a corresponding number of pattern chains 54, 55, 56, 57, 58 mounted upon a corresponding number of sprocket wheels fast upon a shaft 59 supported in or by the bearings or brackets 53. The shaft 59 is provided with a ratchet wheel 60 to which a step-by-step movement is imparted by a pawl 61 pivoted at 62 upon arm 63 itself pivoted at 64 to a link or arm 65 carried by an eccentric 66 upon the main drive shaft s. The construction and mode of operation are such that the ratchet wheel 60 is moved one tooth for each rotation of the drive shaft s, thereby moving each of the pattern chains one step. In this manner a great variety of patterns can be provided as the lugs upon the various pattern chains may be spaced as desired to provide not only for the longitudinal stripes hereinafter more particularly described and consisting of open work or lace work formations, but also for diagonal or irregular formation or stripes of short or intermediate lengths. In fact, the capabilities of the mechanism herein disclosed are almost boundless.

It has heretofore been proposed to form open or lace work effects either as longitudinal rows or as zigzag or other lines by a sinker action, but so far as I am aware without satisfactory results. One of the reasons for the failure to secure satisfactory results by a sinker action has been that the yarn or thread with which a special sinker has engaged in a course of loops has in the subsequent and succeeding courses been robbed by the adjacent needle loops with the result that the attempted open or lace work effect has been of irregular and wholly undesirable shape and the adjacent needle portion has been so enlarged that substantially all effect of a predetermined design is lost, the appearance being rather of irregularly shaped loops with improper spacing therebetween.

So far as I am aware, I am the first to employ special sinkers or instrumentalities interspersed among the needles to take sufficient yarn to form or provide for open work effects, and also to provide co-acting means to rectify the robbing by adjacent or adjoining needle loops of the said taken yarn, whereby well defined open-work effects are preserved. Preferably such co-acting means consists of a suitable formation upon such special sinker or instrumentality, and preferably such suitable formation acts upon a succeeding course and desirably upon the next succeeding course to rectify such robbing.

In the practice of my invention and after a prolonged course of experimentation, I have produced a knitted fabric having open or lace work effects both as straight longitudinal stripes and as other patterns by causing the special sinkers and in the preferred embodiment of my invention the shoulder 25 thereof to engage the yarn or thread during a certain course which may be called the first course and upon the next succeeding course causing the throat 27 to engage that part of the yarn or thread that was drawn or acted upon by the shoulder 25 in the last preceding course, whereby the yarn or thread which after the shoulder 25 has acted thereon in the first course is in part robbed therefrom by the adjacent needle loops of the same course on either side so as unduly and improperly to enlarge said needle loops, is by the throat 27 restored to its former position as the open work, the adjacent needle loops on each side being caused to give up the yarn or thread thus robbed by them. The result is that in the resulting stripe or other pattern of so-called open work or lace effect each edge or margin of the open work or lace effect is well defined and consists of normally and uniformly spaced needle wales. The open or lace effect consists of sinker wales in the preferred embodiment of my invention, referring to the method and product thereof, and the boundary on either side are the needle wales.

Depending upon the particular mechanism employed, and positioning the special sinkers as may be desired or suitable in the particular mechanism, I preferably when using a Banner type of machine proceed substantially as follows: That is to say, I project radially inward one of the special sinkers between certain of the needles as they are descending in the taking of the thread to the lowest point in the stitch formation, as, for example, between the third and fourth needles from the lowest needle at the knitting point. At such point the yarn or thread is received upon the shoulder 25 and remains thereon as an elongation or bight and, though not necessarily, as the needles are rising the said special sinker is or may be retracted very slightly, thus permitting the effective knitting of the adjoining loops in the same course. The special sinker then preferably remains in this same position of projection or nearly complete projection nearly all the way around again to the knitting point. At a suitable point and desirably just after the needles have been elevated to their highest point and just as they reach the level at which they are maintained throughout the greater part of each rotation of the needle cylinder, the said special sinker is retracted far enough to be out of contact with that part of the yarn or thread forming the open work or bight referred to. This relation continues until the point is reached, where the special sinker was first projected. At said point, the knitting now being in the second course, the said special sinker is again projected and to the same extent as formerly, and the said bight or open work part of the yarn or thread which had been engaged by the shoulder 25 in the first course is now engaged by the throat 27 in the second course, while the said shoulder 25 now engages a new part of the yarn or thread in the new course. Due in part at least to the retraction of the sinker, the open work part of the yarn or thread or bight referred to has been drawn upon and absorbed or robbed by the adjacent needle loops on each side, but the reëngagement of such part thereof as remains, by the throat 27 restores the bight or open work to its original extent and having thus been restored it remains unimpaired in the subsequent knitting operation.

The purpose of the engagement of the yarn or thread by the throat 27 is to pull upon the yarn so as to insure the edges of the open work being regular and satisfactory. If such throat 27, which it will be observed is radially inward with respect to the shoulder 25, were not provided, there would inevitably result what may be termed a three needle open effect,—that is, there would exist an ill defined length of yarn or thread of materially less length than desired, and not always existing as such, flanked or bounded on each side by an enlarged needle loop and sometimes by only slightly less enlarged needle loops next adjoining the same. This is wholly undesirable. The action of the throat 27 is to tighten up the said enlarged needle loops by drawing the extra yarn therefrom and restoring it to the open work.

Otherwise expressed, the shoulder 25 of the special sinker measures off or takes a certain amount of extra yarn, which extra amount is further around in the same course partly or fully robbed from it by the adjacent needle loops in the same course. Then in the second course the throat 27 of the special sinker rectifies this robbing and insures the open work—that is, the sinker wale—having all of the open work.

Such an open work fabric differs in several particulars from one wherein the open work or lace work stripe or other effects are due to omitted needles or to some other peculiarity of needle action. By the sinker action, as herein described, more yarn is taken than in regular knitting, instead of less where there are omitted needles, the extra amount of yarn being the amount by which the sum of all of the special sinker wales exceeds the sum of the same number of ordinary sinker wales.

In Fig. 12, I have represented one of the special sinkers at 18, and projected in the first course at the point described so as to receive yarn upon the shoulder 25. The needles are indicated at 67. In Fig. 14, I have represented with substantial accuracy the shape and condition of the sinker wale or open work stripe produced by the action of one of the special sinkers, such, for example, as the special sinker 18, and of the adjacent needle loops and wales. Viewing said figure, it will be observed that the shoulder 25 thereof engages the yarn at 68 and has produced a bight or loop at such point in the said first course. In the next succeeding course, the throat 27 has engaged the same bight or loop at 68ª and has restored it to its original condition, thus counteracting the robbing to which said loop or bight was subjected by the adjacent needle loop. At 68ᵇ, 68ᶜ and 68ᵈ I have indicated the loop or bight 68,—that is, the open work formation—in the succeeding courses, it being noted that the length of yarn 68ᶜ and 68ᵈ is that of the full open work effect and that the length of yarn 68ᵇ is also of the full open work length, but it is somewhat arched in appearance because the bight or loop has not wholly passed from the sinker.

In Fig. 15, I have represented the appearance of the fabric at the point where the special sinker 18 is fully retracted and is freed from the loop indicated at 68. Such loop is therefore at such point and immediately thereafter robbed or contracted by reason of the enlargement of the adjacent needle loops.

In Fig. 16, I have represented wholly diagrammatically three stages of the operation at A, B, C. At A the special sinker, such as 18, acts upon the yarn to produce the loop or bight 68. Upon the retraction of the sinker, the loop or bight 68 shortens as indicated at 68′ and the adjacent needle loops are enlarged as indicated at 69, 70. At C, I have indicated the condition when the throat 27 engages the loop or bight 68 in the second course, the bight or open work effect being indicated at 68′, the adjacent needle loops being restored to their normal size as indicated at 69′, 70′.

In Fig. 17, I have represented a portion of knitted fabric having an open work stripe therein formed in accordance with the method herein disclosed. In Fig. 18, I have represented a hose or stocking herein shown as having a ribbed top 71, a leg 72, a high splice 73 above the heel 74 and a toe 75 preceding which is a portion 76 knitted from the toe yarn but by circular knitting. I have herein represented the said hose or stocking as having open work or lace work stripes 77 at the front of the stocking and open work stripes or lace work stripes 78 at the back of the stocking and extending down to the high splice 73. A highly desirable characteristic of my invention is the readiness with which the open work or lace work stripes or other variations or pattern effects based thereon may be provided throughout the entire extent of the stocking both at front and rear and with equal effectiveness.

The ribbed top 71 is incorporated with a section 79 of plain knitting, that is, of knitting formed upon a single set of needles, and it will be observed that in the practice of my invention the open or lace work may be commenced at any point in the stocking and desirably at about the point 80, namely, at the bottom of said section 79 of plain knitting. So far as I am aware, this effect has not heretofore been produced by needle action, neither has it been produced by sinker action prior to my invention.

I have in describing my invention stated that the special sinkers in the first course draw or measure an amount of yarn which is the full amount, but is robbed partially or wholly, and is restored in the second course, so that in the completed fabric all the courses from the first show the open work as of the full width. This is a characteristic of my invention, but in Figs. 17 and 18, I have indicated at 81 the open or lace work as having upper tapered ends and at 82 I have indicated the said open work stripes as having tapered lower ends. This desirable and characteristic feature is caused, though it need not be employed, by reason of the fact that the courses of the section of fabric 79 are knitted under full tension and they draw upon the first few courses of the leg part 72 of the stocking wherein the open work stripes appear, with the result that the first few courses of the open work stripe may be of gradually increasing width commencing at substantially zero at the point 83 in Fig. 17 and extending to the point 84, where they are of the full width. This feature of the invention may or may not be employed, but is desirably used.

In Fig. 19, I have represented a portion of knitted fabric made by coöperating sinker action in accordance with the somewhat modified form of my invention and in Fig. 20 I have represented a hose or stocking embodying such knitted structure. In producing the open work effect shown in Figs. 19 and 20, I preferably employ a special form of sinker shown in Fig. 22, and which does not have the characteristic shoulder of that form of sinker shown in the constructions heretofore described. Instead the said sinker herein indicated at 85 is provided with a special throat 86 which engages the yarn at a sinker wale in a first course and in several immediately succeeding courses, such as three or four in number. The action is indicated diagrammatically in Fig. 21, wherein at A' I have indicated the first course and have represented the throat 86 of the sinker 85 as engaging the yarn at 87 so as to produce a sinker wale, which, however, is not of abnormal size as compared with a usual sinker wale, that is, in the completed fabric. In the said first course, the yarn is engaged at 87 by the special sinker and adjacent thereto at each side are the needle wales or loops 88, 89. Upon the second course as diagrammatically indicated at B', another sinker wale is engaged by the throat 86 as indicated at 87ª, the preceding sinker wale 87 being again engaged by the same throat. At C', I have indicated the appearance of the completed fabric and therein have indicated the sinker wales 87. 87'. It will be observed that the said sinker wales are of normal size. I have indicated the needle wales adjacent thereto on either side at 88, 89, and it will be observed that these needle wales are of abnormal size, and in fact of such size as to produce an open work effect as clearly indicated in stripes in Fig. 20. This characteristic two-needle effect, as it may be termed, is produced wholly by sinker action, but the sinker wales themselves are not enlarged, the enlargement being wholly in the adjoining needle wales on each side. This enlargement is due evidently or apparently to the fact that the two needles upon which the loops 88, 89 are formed are at or substantially at the lowest knitting point at this time and therefore draw a slight additional amount of yarn from the supply. This additional amount thus appears in the needle loops or wales and not in the sinker wales.

In the hose or stocking shown in Figs. 19 and 20, the open work stripes are provided with tapered ends of the same character as those indicated in Figs. 17 and 18.

In order to move outward the cams which act upon special sinkers, I preferably provide springs 90 indicated in Fig. 5, which act to move its cam outward when permitted to do so by the pattern chain pertaining to such cam.

I do not herein claim the process and the product claimed in my co-pending application Serial No. 317,069, filed August 12, 1919.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A sinker or like knitting instrumentality having a web-engaging formation and also having means above the web-engaging formation to engage the same identical loop in and during the formation of the course in which said loop exists and also during the formation of a subsequent course.

2. A sinker or like knitting instrumentality having a web engaging formation and thereabove having a shoulder to engage the yarn and provide an elongation thereof in a course and below said shoulder having a formation to engage said elongation when in the next succeeding course of fabric.

3. A sinker or like instrumentality having means to apportion yarn to the same identical loop both in the formation of the course in which that loop exists and also during the formation of a course subsequent to that in which said loop exists.

4. A sinker or like instrumentality having a web engaging formation, a shoulder 25 to engage yarn of a primary course and a throat 27 to engage the same part of the yarn in a succeeding course.

5. A series of sinkers or like knitting instrumentalities each having a web engaging formation and also each having yarn robbing preventing means to twice engage an identical loop for the production of open work.

6. A sinker or like knitting instrumentality having a web engaging part and having a formation to engage the yarn and produce an elongated sinker wale in a course and having another formation to engage said same elongation in the sinker wale during the formation of a succeeding course, said formations coöperating to produce an elongated sinker wale and to prevent robbing, thereby securing the permanent apportionment of the yarn in such elongated sinker wale.

7. Knitting mechanism comprising in combination a series of needles and a series of sinkers including interspersed special sinkers or instrumentalities, and operating means to cause the special sinkers or instrumentalities to measure off or take additional yarn and thereafter to prevent robbing, thereby securing the permanent apportionment of such additional yarn.

8. Knitting mechanism comprising in combination, a series of needles, and a series of sinkers including interspersed special sinkers or instrumentalities, and means to operate said parts whereby upon a primary course said special sinkers measure off or take additional yarn and are subsequently in the same course retracted therefrom, and whereby in a succeeding course said additional yarn is permanently apportioned to the sinker wales of said special sinkers.

9. Knitting mechanism including in combination, a series of needles, operating means therefor, and a series of sinkers including interspersed special sinkers or instrumentalities, a special cam for one or more of said special sinkers, the main drive shaft for said needle operating means, a movable pattern member distinct from said needle operating means, means carried by said shaft to move said pattern member, adapted to effect the movement of said special sinkers or instrumentalities to measure off or take additional yarn and thereafter to prevent robbing, and operative connections between said pattern member and said special cam.

10. Knitting mechanism comprising in combination, a series of needles and a series of sinkers including interspersed special sinkers or instrumentalities, and means to operate said parts, whereby said special sinkers or instrumentalities engage certain predetermined loops at least twice, i. e. in the formation of at least two courses of the fabric in effecting the complete formation of said loops as contrasted with a web-engaging function of said special sinkers or instrumentalities.

11. Knitting mechanism comprising in combination, a series of needles operating means therefor, driving means for said operating means and a series of sinkers including interspersed special sinkers or instrumentalities shaped to engage the yarn and form open or lace work sinker wales therein, one or more movable cams to operate said special sinkers, one or more pattern chains to act upon said cams, adapted to effect the movement of said special sinkers or instrumentalities to measure off or take additional yarn and thereafter to prevent robbing, and means to move said pattern chain or chains from said driving means, whereby the open or lace work formation is controlled by said pattern chain or chains.

12. Knitting mechanism comprising in combination, a series of needles and a series of sinkers including interspersed special sinkers or instrumentalities, and operating means for said special sinkers or instrumentalities, the latter each having a conformation to effect the measuring off or taking of additional yarn and the subsequent non-robbing prevention of that taken yarn.

13. Knitting mechanism comprising in combination, a series of needles and a series of sinkers including interspersed, open work or lace work sinkers or instrumentalities, and means to impart additional yarn-taking-movement and subsequent yarn-robbing-prevention-movement to said sinkers.

14. Knitting mechanism comprising in combination, a series of needles and a series of sinkers alternating therewith and including interspersed members shaped to engage the yarn and form open or lace work sinker wales therein, each of said members having a web engaging formation and a yarn-engaging formation to engage the yarn between the adjacent needles in a loop receiving course and another formation to engage the identical loop that is engaged by said yarn engaging formation, and thereby prevent robbing.

15. Knitting mechanism comprising in combination, a series of needles and a series of sinkers alternating with the needles, said series of sinkers having interspersed thereamong at intervals a plurality of special sinkers or instrumentalities, and means to operate said special sinkers or instrumentalities whereby in one course said special sinkers or instrumentalities measure off or take additional yarn, and whereby upon a succeeding course, such additional yarn is permanently apportioned to the wales produced by said special sinkers or instrumentalities.

16. Knitting mechanism comprising in combination, a series of needles and a series of sinkers alternating with the needles, said series of sinkers having interspersed thereamong at intervals a plurality of special sinkers or instrumentalities, and means to operate said special sinkers or instrumentalities, whereby in one course said special sinkers or instrumentalities take sufficient yarn for the formation of a corresponding number of open-work effects, and whereby upon a succeeding course, such additional yarn is permanently apportioned through the agency of said special sinkers or instrumentalities to the respective open-work effects.

17. Knitting mechanism comprising in combination, a series of needles and a series of sinkers alternating with the needles, said series of sinkers having interspersed thereamong at intervals a plurality of special sinkers or instrumentalities, each of said special sinkers or instrumentalities having a yarn engaging formation constructed and arranged to take upon one course sufficient yarn for the formation of a corresponding number of open-work effects, each of said special sinkers or instrumentalities having another yarn engaging formation constructed and arranged to engage the yarn of said open-work effects upon a subsequent course and by such engagement permanently to apportion said previously taken yarn to said several open-work effects.

18. Knitting mechanism comprising in combination, a series of needles and a series of sinkers alternating with the needles, said series of sinkers having interspersed thereamong at intervals a plurality of special sinkers or instrumentalities, each of said sinkers or instrumentalities having a yarn engaging formation constructed and arranged to take upon one course sufficient yarn for the formation of a corresponding number of open-work effects, and means active upon a succeeding course to rectify the robbing by needle loops of said yarn taken by the sinkers or instrumentalities for said open-work effects.

19. Knitting mechanism comprising in combination, a series of needles and a series of sinkers alternating with the needles, said series of sinkers having interspersed thereamong at intervals a plurality of special sinkers or instrumentalities, each of said sinkers or instrumentalities having a yarn engaging formation constructed and arranged to take upon one course sufficient yarn for the formation of a corresponding number of open-work effects, and means to rectify the robbing by needle loops of said yarn taken by the sinkers or instrumentalities for said open-work effects.

20. Knitting mechanism comprising in combination, a series of needles, and a series of sinkers or the like including one or more special sinkers or instrumentalities, and means to operate said special sinkers or instrumentalities whereby the special sinker or sinkers measure off or take additional yarn on a primary course, and thereafter rectify the robbing of such additional yarn by needle loops.

21. A sinker or like knitting instrumentality having a web engaging formation, a terminal shoulder above said formation and presenting a substantially vertical face adapted to engage the yarn and to take sufficient yarn for the formation of an open-work effect, and a formation intermediate said web engaging formation and said shoulder to engage the yarn of the open-work effect upon a subsequent course, thereby to rectify the robbing therefrom by needle loops.

22. A sinker or like knitting instrumentality having a web engaging formation, a terminal shoulder above said formation and presenting a substantially vertical face adapted to engage the yarn and to take sufficient yarn for the formation of an open-work effect, and a formation intermediate said web engaging formation and said shoulder to engage the yarn of the open-work effect upon a subsequent course, thereby to rectify the robbing therefrom by needle loops, the said intermediate formation being radially inward beyond said shoulder when the said special sinker is in operative position.

23. A sinker or like knitting instrumentality having a web engaging formation, a formation above said web engaging formation and adapted to engage the yarn and to take sufficient yarn for the formation of an open-work effect, and an intermediate formation to engage the yarn of the open-work effect upon a subsequent course, and thereby to rectify the robbing therefrom by adjacent needles.

24. Knitting mechanism comprising in combination, a series of needles and a series of sinkers including interspersed special sinkers or instrumentalities, means to cause said special sinkers or instrumentalities to measure off or take additional yarn, and means to prevent robbing of said additional yarn, thereby securing the permanent apportionment of such additional yarn.

25. Knitting mechanism comprising in combination, a series of needles and a series of sinkers alternating therewith and including interspersed members shaped to engage the yarn and form open or lace work sinker wales therein, each of said members having a web-engaging formation, and a yarn-engaging formation to engage the yarn between the adjacent needles in a loop-receiving course, and another formation to engage during the formation of a succeeding course the identical loop that is engaged by said yarn-engaging formation.

26. Knitting mechanism comprising in combination a series of needles, and a series of sinkers including interspersed, open work or lace work sinkers or instrumentalities, and means to cause by said sinkers or instrumentalities the permanent apportionment of the yarn to the open or lace work effect of said sinkers by imparting to said sinkers or instrumentalities movement to measure off or take additional yarn, and thereafter to prevent robbing.

27. That method of knitting comprising interknitting a series of loops in successive courses to form needle wales with interposed sinker wales between adjacent needle wales and during such interknitting apportioning at a predetermined point or points an excess amount of yarn or thread between adjacent needle wales, and thereafter rectifying and reëstablishing said excess amount of yarn or thread, thereby establishing a permanent, clearly defined, open work area.

28. That method of knitting comprising interknitting a series of loops in successive courses to form needle wales with interposed sinker wales between adjacent needle wales, and during such interknitting apportioning at a predetermined point or points an excess amount of yarn or thread between adjacent needle wales, and upon a succeeding course rectifying or reëstablishing said excess amount of yarn or thread, thereby establishing a permanent, clearly defined, open work area.

29. That method of knitting comprising interknitting a series of loops in successive courses to form needle wales with interposed sinker wales between adjacent needle wales, and during such interknitting apportioning at a predetermined point or points an excess amount of yarn or thread to one or more sinker wales, and upon a succeeding course rectifying or reëstablishing such excess amount of yarn or thread, thereby establishing a permanent, clearly defined, open work area.

30. That method of knitting comprising interknitting a series of loops in successive courses to form needle wales with interposed sinker wales between adjacent needle wales, and during such interknitting apportioning at a predetermined point or points an excess amount of yarn or thread to one or more sinker wales, and upon the next succeeding course reapportioning to such sinker wale or wales the yarn or thread robbed therefrom by adjacent needle wales.

31. That method of knitting comprising interknitting a series of loops in successive courses to form needle wales with interposed sinker wales between adjacent needle wales, and during such interknitting measuring off or taking a predetermined amount of extra yarn at one or more points throughout the course, and upon a succeeding course rectifying the robbing of the extra yarn by adjacent needle loops.

32. That method of knitting comprising interknitting a series of loops in successive courses to form needle wales with interposed sinker wales between adjacent needle wales and during such interknitting measuring off or taking additional yarn for certain wales, and thereafter preventing robbing, thereby securing the permanent apportionment of such additional yarn for said wales.

33. That method of knitting comprising interknitting a series of loops in successive courses to form needle wales with interposed sinker wales between adjacent needle wales, and during such knitting, securing the permanent apportionment of yarn in the formation of certain elongated sinker wales by apportioning the necessary additional yarn to said sinker wales and by thereafter preventing the robbing of such additional yarn.

34. That method of knitting comprising itnerknitting a series of loops in successive courses to form needle wales with interposed sinker wales between adjacent needle wales and during such knitting taking the following separate steps, namely, first step, supplying additional yarn to certain of said sinker wales; and second step, preventing robbing by adjacent wales of such additional yarn, whereby open-work formation is permanently secured.

35. Knitting mechanism comprising in combination, a series of needles and a series of interposed sinkers or like instruments, means to operate said needles and sinkers for the production of knitted loops and including means relatively to move certain of said needles and sinkers to measure off or take additional yarn for open or lace work wales, and means to prevent robbing of said additional yarn, thereby securing the permanent apportionment of such additional yarn.

In testimony whereof I have signed my name to this specification.

WILLIAM A. HOUCK.